July 27, 1954

E. V. BERGSTROM 2,684,768

APPARATUS FOR HANDLING CONTACT
MASS UNDERGOING REGENERATION

Filed Feb. 26, 1952

INVENTOR.
ERIC V. BERGSTROM

BY
ATTORNEY

July 27, 1954

E. V. BERGSTROM 2,684,768

APPARATUS FOR HANDLING CONTACT
MASS UNDERGOING REGENERATION

Filed Feb. 26, 1952

INVENTOR.
ERIC V. BERGSTROM
BY
ATTORNEY

July 27, 1954

E. V. BERGSTROM 2,684,768

APPARATUS FOR HANDLING CONTACT
MASS UNDERGOING REGENERATION

Filed Feb. 26, 1952

INVENTOR.
ERIC V. BERGSTROM
BY
ATTORNEY

Patented July 27, 1954

2,684,768

UNITED STATES PATENT OFFICE 2,684,768

APPARATUS FOR HANDLING CONTACT MASS UNDERGOING REGENERATION

Eric V. Bergstrom, Short Hills, N. J., assignor to Socony-Vacuum Oil Company, Incorporated, a corporation of New York Application February 26, 1952, Serial No. 273,495

6 Claims. (Cl. 214—17)

This application is directed to an improved process and apparatus for the continuous contacting of adsorbent powdered material with oils and refers more particularly to the continuous revivification of spent powdered adsorbent material which has been used for treating liquid oils.

An example of the type of process to which the invention appertains is the contact refining of lubricating oils to remove gum-forming compounds, color bodies and other objectionable material.

The material generally used as the pulverized or powdered adsorbent is clays such as fuller's earth, silica gels, bauxites, bentonite, montmorillonites, activated charcoal, and certain synthetic associations of silica and alumina to which other material such as certain metallic oxides may be added. This material should be pulverized to a grain size which will pass through a 100 mesh Tyler screen and preferably within the range of about 150–400 mesh size.

In these contact filtration processes, the powdered material becomes fouled by the deposition of carbonaceous material and oily constituents upon its surface. By the use of solvents such as naphtha, low boiling alcohols and ketones, some of the contaminants can be removed, but the operation is too costly and inefficient to be considered commercially practical. The usual custom in this art is to subject the spent adsorbent material to a combination of steaming and naphtha washing to effect removal of the oily constituents from the adsorbent, after which the naphtha may be distilled off in a rotary drum kiln followed by burning of the contaminants in another mechanically driven kiln. This procedure has not proved satisfactory because of the high heat cost involved in distilling the naphtha from the adsorbent particles and because the efficiency of the adsorbent for treating oils was to a great extent lost in the burning regeneration. The latter difficulty is in a large part due to the impossibility of providing adequate temperature control of the adsorbent by burning regeneration in rotary drum kilns and similar kilns employed commercially.

A major object of this invention is the provision of an improved process for revivifying finely divided adsorbent contact materials which have become spent by use in the contact treatment of liquid oils.

A further object of this invention is to provide a means for transferring high temperature spent adsorbent contact materials from one zone to another at a controlled rate.

Another object of this invention is to provide a means for transferring at a controlled rate high temperature spent adsorbent contact materials from one zone to another, maintaining a seal therebetween.

These and other objects of this invention will be made apparent by the following description read in view of the attached drawings, in which:

Figure 1 shows a schematic view of apparatus adapted to continuously revivify spent adsorbent material, and in which;

Figure 2 is a vertical view, a portion of which is sectioned, of a continuous conveyor showing the sealing means and in which Figure 3 shows a vertical schematic view, a portion of which is shown in section, of the valve means disclosed in this invention, and in which

Figure 1:
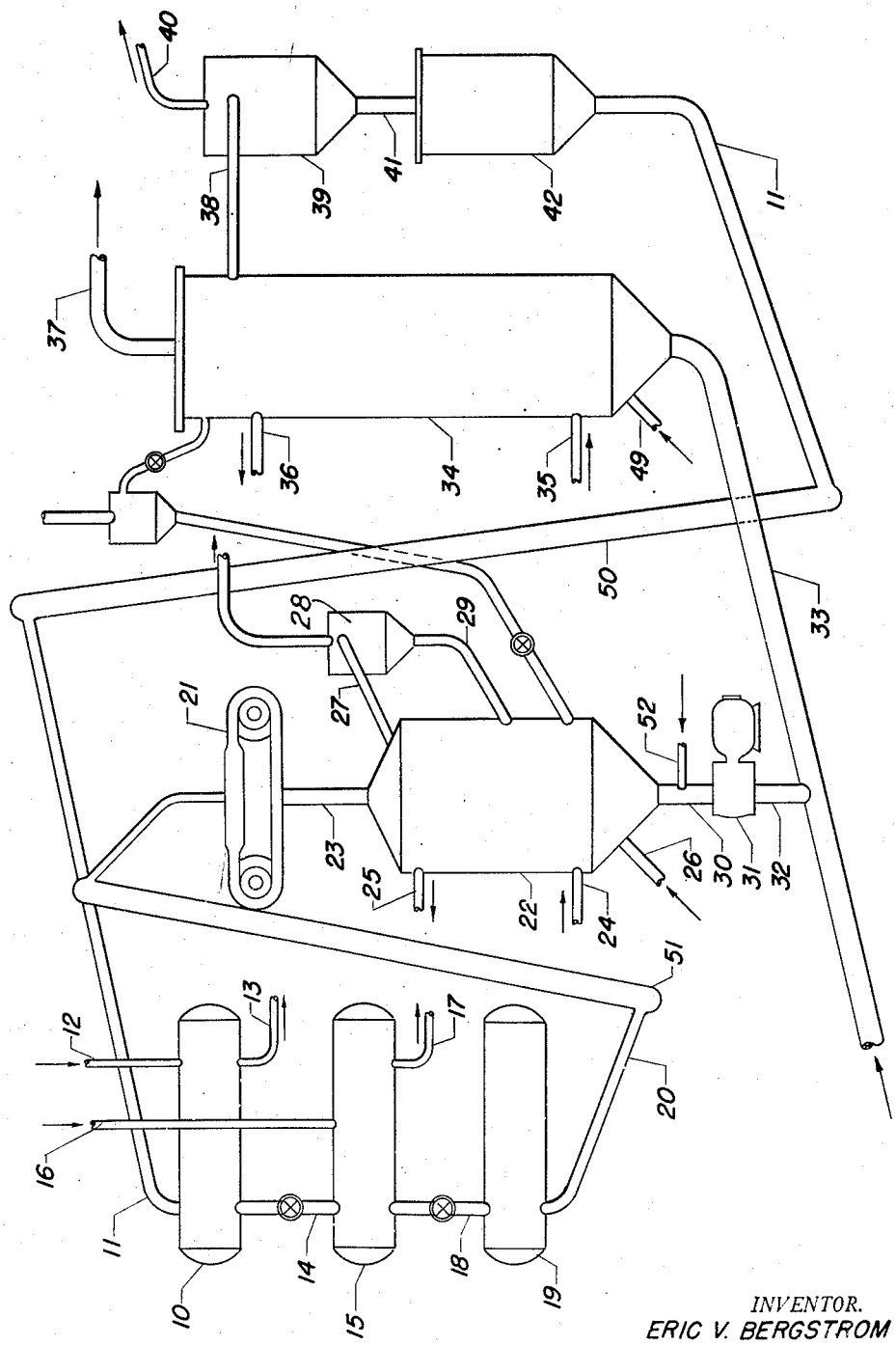

By referring to Figure 1, the application of this invention to a process for decolorizing petroleum oils will be described for explanatory purposes. Pulverized contact material is admitted to the contacting chamber 10 through conduit 11. Hot petroleum oil to be decolorized, is admitted to the chamber 10 through conduit 12, and the decolorized oil is withdrawn through the conduit 13, for further processing in conventional refinery apparatus, not shown. The spent catalyst is continuously removed from the chamber 10 through the conduit 14 to the solvent washing chamber 15. A light solvent, previously described, is admitted to the chamber 15 through conduit 16, and the contaminated solvent, including oily constituents removed from the catalyst surface, is removed from the chamber 15 through the conduit 17 to recovery apparatus of conventional design, not shown. The washed catalyst is fed through the conduit 18 to the filter 19, and the filtered catalyst material is removed therefrom through the conduit 20.

In this invention, the filtered catalyst powder is conducted, via the conduit 20 and elevator 51 to a conveyor of the Redler type, adapted to receive powder at a lower pressure than it is delivered therefrom. Several conveyors of this general type are available commercially and consequently will not be described in detail. In essence, their operation depends upon the maintenance, at some point between the entrance and exit of the conveyor, of clearances sufficiently close to provide a gas tight seal therebetween. For example, the powder may be delivered to the conveyor 21 at atmospheric pressure, and from the conveyor 21 into dryer 22, via the conduit 23, at say 5 p. s. i. pressure. It is an advantageous feature of this invention, that this dryer 22 is enabled to operate under pressure, as will be hereinafter disclosed.

Within the dryer 22, which may be of any suitable construction, such as a vertical vessel of circular or rectangular cross section, may be located a series of horizontal or vertical coils, not shown, for the purpose of temperature control. The coils may be provided with temperature controlling fluid through the conduit 24, and the fluid thereafter removed through the conduit 25. The fluid may conveniently be flue gas, or steam from various locations in the refinery. A stripping fluid, such as superheated steam, is admitted to the dryer 22 through the conduit 26, from a source not shown, in sufficient quantity and at such a flow rate that the powder is maintained in ebullient motion. The temperature of the catalyst in the dryer is maintained approximately within the range of 300–700° F., or more preferably at about 500° F., by means of the steam temperature and the temperature controlling coils. As an alternative method hot regenerated catalyst, at a temperature of approximately 1000–1200° F., may be fed to the dryer in sufficient quantity to impart rapidly, enough heat to raise the temperature of the wet catalyst to the desired level.

Steam, with a small quantity of entrained catalyst, is removed from the dryer 22 through the conduit 27, carrying therewith the removed naphtha. The steam and naphtha are taken overhead from a cyclone separator 28 and conducted to recovery apparatus of conventional design, not shown. Separated catalyst is returned from the separator 28 to the dryer 22 through the conduit 29. The dried catalyst is removed from the dryer 22 through conduit 30, and admitted to the control valve 31, described in detail hereinafter. The catalyst is fed in controlled amounts from the control valve 31, through the conduit 32 into the reduced pressure zone in conduit 33. The catalyst is carried pneumatically through conduit 33, by means of carrying gas injected therein, to the bottom of a regeneration kiln 34. The carrying gas supplied to conduit 33 is flowed rapidly enough to maintain a relatively dense fluidized bed of catalyst within the regenerator. And furthermore, the aeration gas may be combustion supporting to maintain the regeneration within the regenerator kiln. If desired, all or part of the combustion supporting gas may be admitted to the regenerator 34 through the conduit 49 from a source not shown. The kiln is equipped with temperature controlling coils to which temperature controlling fluid may be admitted through the conduit 35 and expelled through the conduit 36. By proper control, the temperature may be maintained within the regenerator at a suitable burning temperature, approximately 1100–1300° F., whereby the spent catalyst is revivified. The major portion of the regenerator gases may be taken overhead through the conduit 37 to be disposed of in accordance with usual refinery technique. The major portion of the revivified catalyst may be removed from the regenerator 34 through the conduit 38 to the cyclone separator 39. The gases are taken overhead through conduit 40 for later disposal, and the catalyst is removed through conduit 41 to a storage chamber 42. From this storage chamber the powdered material may be returned through the conduit 11, and elevator 50, to the contacting chamber 10, to complete the continuous contacting process.

Figure 2:
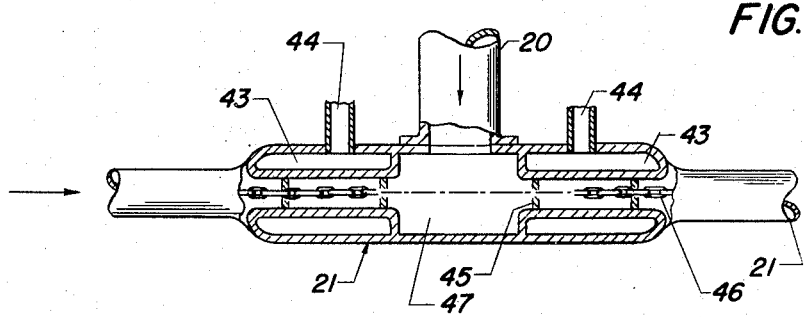

The type of conveyor 21 shown on Figure 1, makes it possible to feed into the dryer 22, operated under pressure, maintaining an adequate gas-tight seal. A portion of the conveyor 21 is shown in cross section on Figure 2. The powdered catalyst is fed through conduit 20 into a receiving chamber 47 in the enlarged section of the conveyor. At each end of the enlarged section are toroids 43, 43, made of rubber or rubber-like material, inflated with fluid admitted through conduits 44, 44. The flights 45 of the conveyor are disk shaped members having a periphery of soft material adapted to make a gas-tight seal while sliding through the toroids 43, 43. The flights 45 are connected by means of an endless chain 46 through their center. The flights are moved mechanically in a conventional manner, not shown, causing catalyst to be moved from the receiving region 47 to the conveyor exit, a region of higher pressure. From the exit of the conveyor the catalyst is passed into the dryer 22 as shown on Figure 1.

The dry catalyst is removed from the dryer through the outlet conduit 30 located therebelow, as shown on Figure 1. There may be a tendency for the catalyst in this conduit 30 to form a bridge, hampering the flow. To prevent bridging of the catalyst, an inert gas, such as steam, may be admitted to conduit 30 through conduit 52 in sufficient quantity to form a dense fluidized bed of particles.

Figure 3:
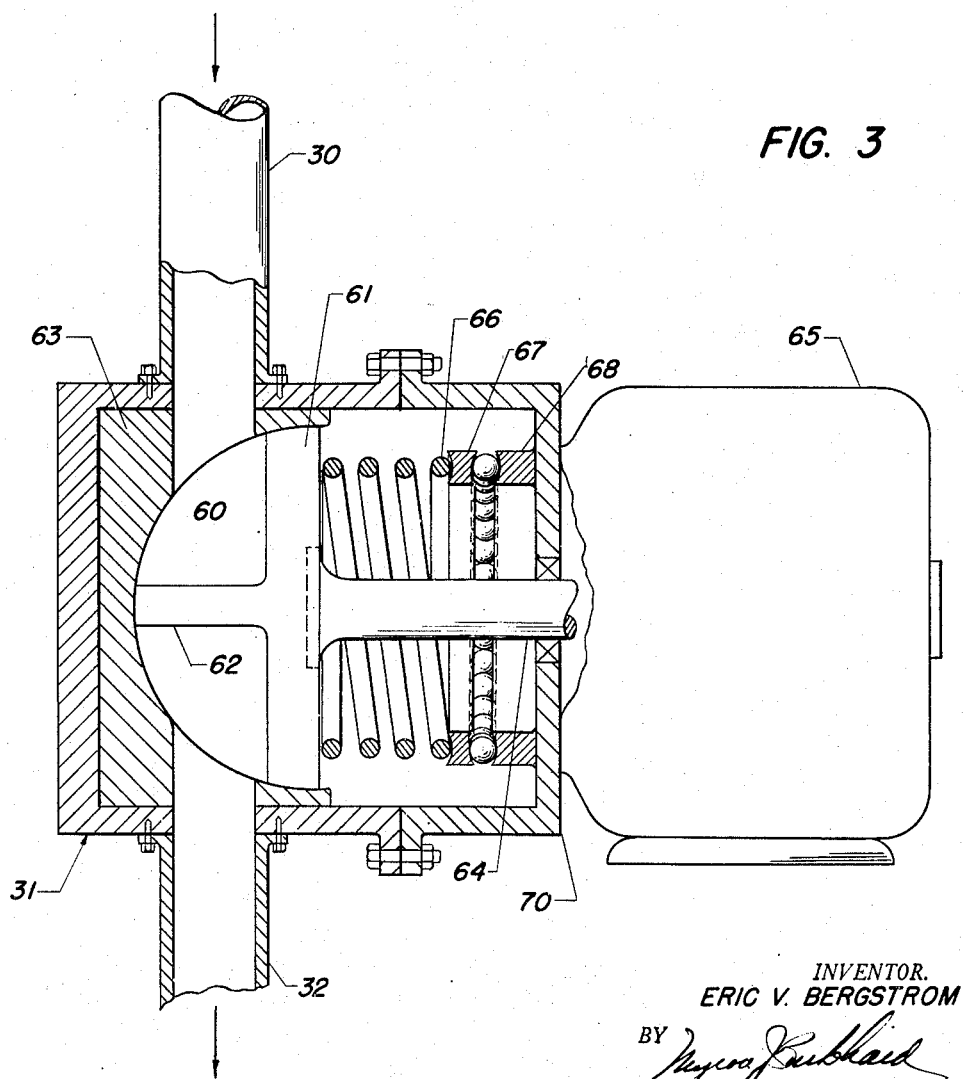

The powdered catalyst from the dryer, passed through the conduit 30, is admitted to the metering valve 31, shown in detail on Figure 3. The valve has the general design characteristics of a conventional star valve. At first appraisal a conventional star valve might appear to be applicable for this duty. Attempts to use a star valve for transferring hot powdered catalyst under the conditions disclosed result in difficulties of operation, which are overcome by the device disclosed hereinafter. For example, the powder is somewhat abrasive causing the mating surfaces of the valve to erode. The erosion of the metal is further augmented by the heat imparted to the metal surfaces from the hot catalyst. If the star wheel is used to separate zones of different pressure, as is customary, the enlarged clearances caused by the erosion, permit the interchange of gases between the zones, which is undesirable. When handling powder, the escaping gas may cause the powder to be blown with the gas, disrupting the desired flow of catalyst.

In this invention, wear between the stationary and moving parts of the valve is materially reduced by using inserts of a material highly resistant to heat, and possessing good wear characteristics at high temperature. There are a variety of refractory materials available for this use, in addition to various metals and alloys such as Meehanite, gray iron, chilled iron, cast chrome-nickel, etc. Further, whatever small amount of wear that may be encountered in this valve may be compensated for by the unusual design of the valve.

Referring to Figure 3 for illustration, catalyst lowered through conduit 30 enters the valve 31, filling space 60, formed by intersecting blades of the valve rotor disk 61. The blades or vanes may be 3 or more in number spaced at equal distances around the rotor disk 61. The vanes are unusual in that they are quadrantal in shape, designed to mate with a hemispherical or dish shaped insert 63. By this means, the vanes retain a tight seal when in operation. There is less tendency for the fine powder to pack in crevices in this valve than in the customary star feeder.

In addition to the above indicated advantages of this valve design, the valve is equipped to maintain constant operating clearances by an integral take-up mechanism. The rotor shaft 64 is connected to and driven by a motor 65 or any other convenient source of rotational power. Within the housing 70 and bearing against the back of the rotor 61 is situated a helical spring 66. One end of spring 66 contacts the moving race 67 of a ball bearing. The static race 68 of this bearing is mounted rigidly to the housing 70. It is seen, that as a result of the spherical shape, as the mating surfaces of the valve wear, the thrust load will cause the rotor to shift slightly, sufficient to maintain at all times the same operating clearance between the rotor blades and the mating spherical insert.

Figure 4:
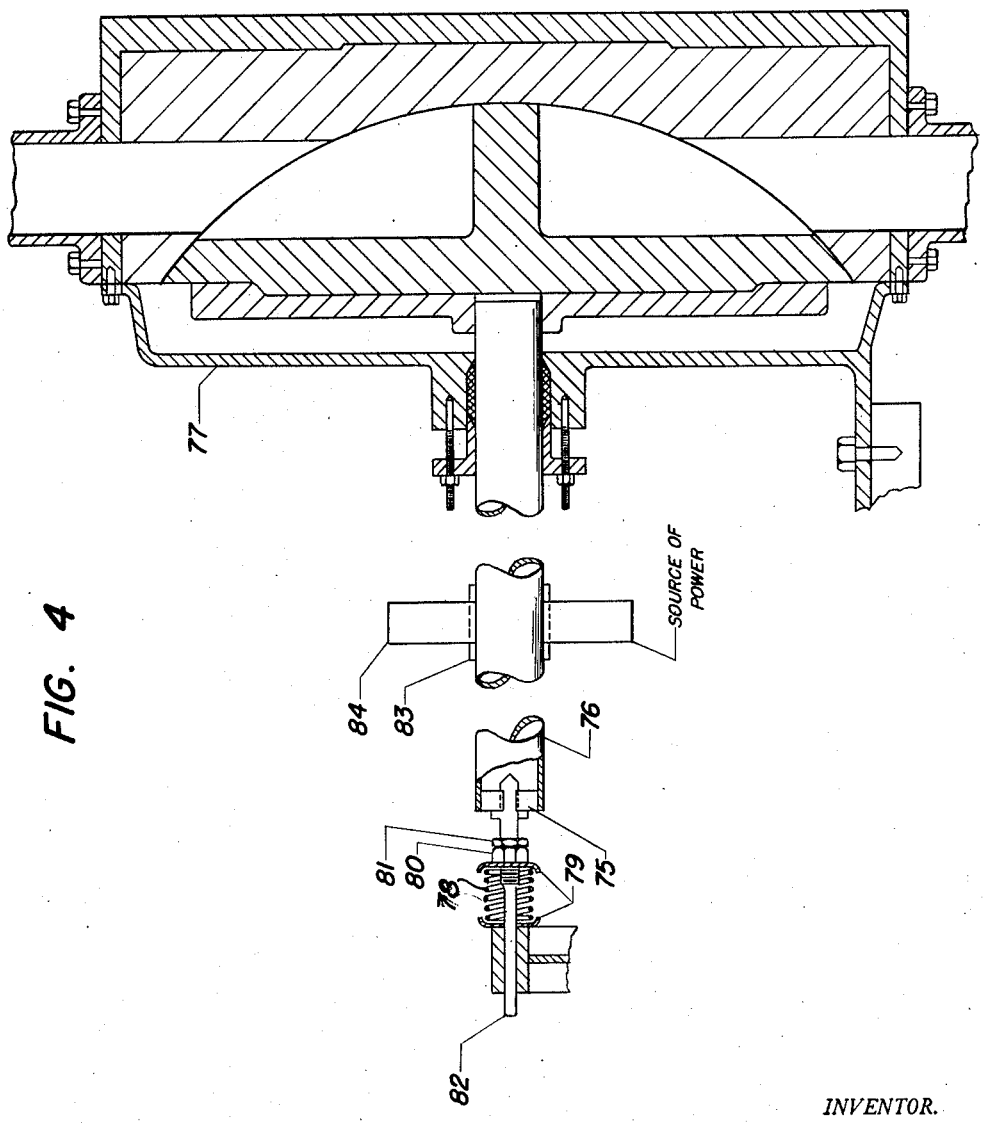
Figure 4 is a vertical view, a portion of which is sectioned, of an alternate valve means adaptable to this invention.

In Figure 4 is shown a modified design of the spherical valve. The thrust bearing 75 is mounted in the end of the rotor shaft, located outside the housing 77. The spring 78, which does not rotate in this modification, is retained between the retaining washers 79, 79. The adjusting nut 80, and locking nut 81, threaded on the mandrel 82, permit the thrust load to be adjusted as desired.

Difficulty may be experienced in getting a star valve to feed properly with small particle material, particularly with powdered material. By this invention, as previously described, the pressure in the dryer 22, Figure 1, may be maintained above that of the rest of the system. For example, powdered catalyst may be fed to the dryer from a region of lower pressure, by means of the above described conveyor, and by means of the spherical valve, may be fed from the dryer to a region of lower pressure in the conduit 33. This permits powdered catalyst to be fed to the spherical valve at a higher pressure than it is discharged therefrom, causing the operation of the valve to be improved.

The shaft 76 must be mounted in suitable bearings to properly locate the shaft, but the bearings must not impose a thrust load, or prevent the lateral movement of the shaft when the mating surfaces of the valve wear. Any simple journal bearings may be used for this purpose. The shaft is driven through the driving member 84, which may be a pulley, sprocket, or gear, by any suitable source of power, not shown. The driving member 84 must not interfere with the lateral motion of the shaft 76. This can be accomplished by using mating splines 83 on the shaft and hub of the driving member. The drive means does not form a part of this invention, and will not be further described.

It is understood that this invention is not limited to the specific embodiments shown, being limited only by the following appended claims.

I claim:

1. Apparatus for transferring at a controlled rate hot, solid, finely-divided contact material from one zone in which it is maintained in fluidized condition to another zone wherein a substantially different pressure prevails, and substantially without the interchange of fluid between said zones despite said pressure differential, said apparatus comprising valve means including a housing, a removable wear-resistant insert located inside said housing shaped to form a hemispherical depression, a rotatably mounted shaft projected through the wall of said housing opposite said insert, a bracket attached to the inner end of said shaft, a removable disc attached to said bracket concentric with said shaft adapted to coact with and substantially seal the hemispherical depression in said insert, quadrantal vanes attached to said disc located inside said hemispherical depression to substantially separate the enclosed space within said housing into at least three compartments, said housing having entrance and exit ports through the wall thereof aligned with similar ports through said insert to permit the solid, finely-divided contact material to enter and exit from said compartments during rotation of said shaft, and means for applying a thrust to said shaft to cause said quadrants to continuously contact said insert.

2. Apparatus as defined in claim 1 further characterized by the fact that said thrust applying means is located outside of said housing.

3. Apparatus as defined in claim 1 further characterized by the fact that said thrust applying means comprises a bearing attached to the outside end of said shaft, a stationary mandrel attached to said bearing, a movable retaining washer surrounding said mandrel, an adjusting nut in threaded contact with said mandrel adapted to move said movable retaining washer, a lock nut in threaded contact with said mandrel adapted to secure said adjusting nut in locked position, a fixed retaining washer surrounding said mandrel, in helical spring located between said retaining washers whereby said thrust is applied to said shaft.

4. Apparatus for transferring at a controlled rate hot, solid, finely-divided contact material from one zone in which it is maintained in fluidized condition to another zone wherein a substantially different pressure prevails, and substantially without the interchange of fluid between said zones despite said pressure differential, said apparatus comprising valve means including a housing, a rotatably mounted shaft projected through the wall of said housing, vanes attached to the end of said shaft within said housing, a disc attached to said shaft and concentric therewith adapted to contact the inside of said housing around its periphery, said disc attached to the ends of said vanes to provide an end wall for the compartments located between said vanes, said housing adapted to enclose the remainder of said vanes to enclose the compartments between said vanes, said vanes and disc having a curved outer edge, said housing further having entrance and exit ports through the walls thereof to permit the solid, finely-divided contact material to enter and exit from said compartments during rotation of said shaft, and means for applying a thrust to said shaft to cause said vanes to continuously contact said housing.

5. Apparatus for transferring at a controlled rate hot, solid, finely-divided contact material from one zone in which it is maintained in fluidized condition to another zone wherein a substantially different pressure prevails, and substantially without the interchange of fluid between said zones despite said pressure differential, said apparatus comprising valve means including a housing, a rotatably mounted shaft projected through the wall of said housing, vanes attached to the end of said shaft within said housing, a disc attached to said shaft and concentric therewith adapted to contact the inside of said housing around its periphery, said disc attached to the ends of said vanes to provide an end wall for the compartments located between said vanes, said housing adapted to enclose the remainder of said vanes to enclose the compartments between said vanes, said housing further having entrance and exit ports through the walls thereof to permit the solid, finely-divided contact material to enter and exit from said compartments during rotation of said shaft, and spring means for applying a thrust to said shaft to cause said vanes to continuously contact said housing.

6. Apparatus as claimed by claim 1, further characterized in that said means for applying a thrust comprises a spring located within said housing between said disc and one race of a ball bearing whose other race is fixedly attached to an inner wall of said housing, thereby continuously biasing said disc into contact with said wear-resistant insert during rotation of said shaft.

References Cited in the file of this patent

UNITED STATES PATENTS

| Number | Name | Date |
|---|---|---|
| 1,866,294 | Chatt | July 5, 1937 |

FOREIGN PATENTS

| Number | Country | Date |
|---|---|---|
| 315,116 | Germany | Oct. 25, 1919 |